United States Patent [19]

Bolinder et al.

[11] Patent Number: 4,597,994
[45] Date of Patent: Jul. 1, 1986

[54] METHOD OF PRODUCING PROGRESSIVELY BURNING ARTILLERY PROPELLANT POWDER AND AGENT ADAPTED THERETO

[75] Inventors: Boo Bolinder; Hermann Schmid, both of Karlskoga, Sweden

[73] Assignee: Aktiebolaget Bofors, Bofors, Sweden

[21] Appl. No.: 690,072

[22] Filed: Jan. 9, 1985

[51] Int. Cl.$^4$ .............................................. B05D 1/22
[52] U.S. Cl. .................................... 427/213; 427/221; 102/288; 102/290; 102/292
[58] Field of Search ............... 102/288, 290, 292; 427/213, 221

[56] References Cited

U.S. PATENT DOCUMENTS

| | | | |
|---|---|---|---|
| 3,636,882 | 1/1972 | Aaronson et al. | 102/292 |
| 3,948,697 | 4/1976 | Flanagan et al. | 102/290 X |
| 3,992,558 | 11/1976 | Smith-Johannsen | 427/213 |
| 4,187,215 | 2/1980 | Wrightson | 102/292 |
| 4,354,884 | 10/1982 | Williams | 102/290 |

Primary Examiner—Shrive P. Beck
Attorney, Agent, or Firm—Pollock, Vande Sande & Priddy

[57] ABSTRACT

The invention relates to a general method of producing progressively burning deterrent-coated powder, more particularly propellant powder for weapons having barrels. According to the method a film-forming, preferably polymerizable deterrent substance is fed to the powder loosely or dispersed in a liquid phase which is thereafter driven off. The invention also relates to a method of giving a deterrent coating to granular powder or powder cut up in to short pieces (so-called tubular powder) in a fluidized bed. Finally, the invention relates to a special deterrent substance in the form of a water-dispersable polyurethane built up on an aliphatic isocyanate and a caprolacton polyester.

15 Claims, 2 Drawing Figures

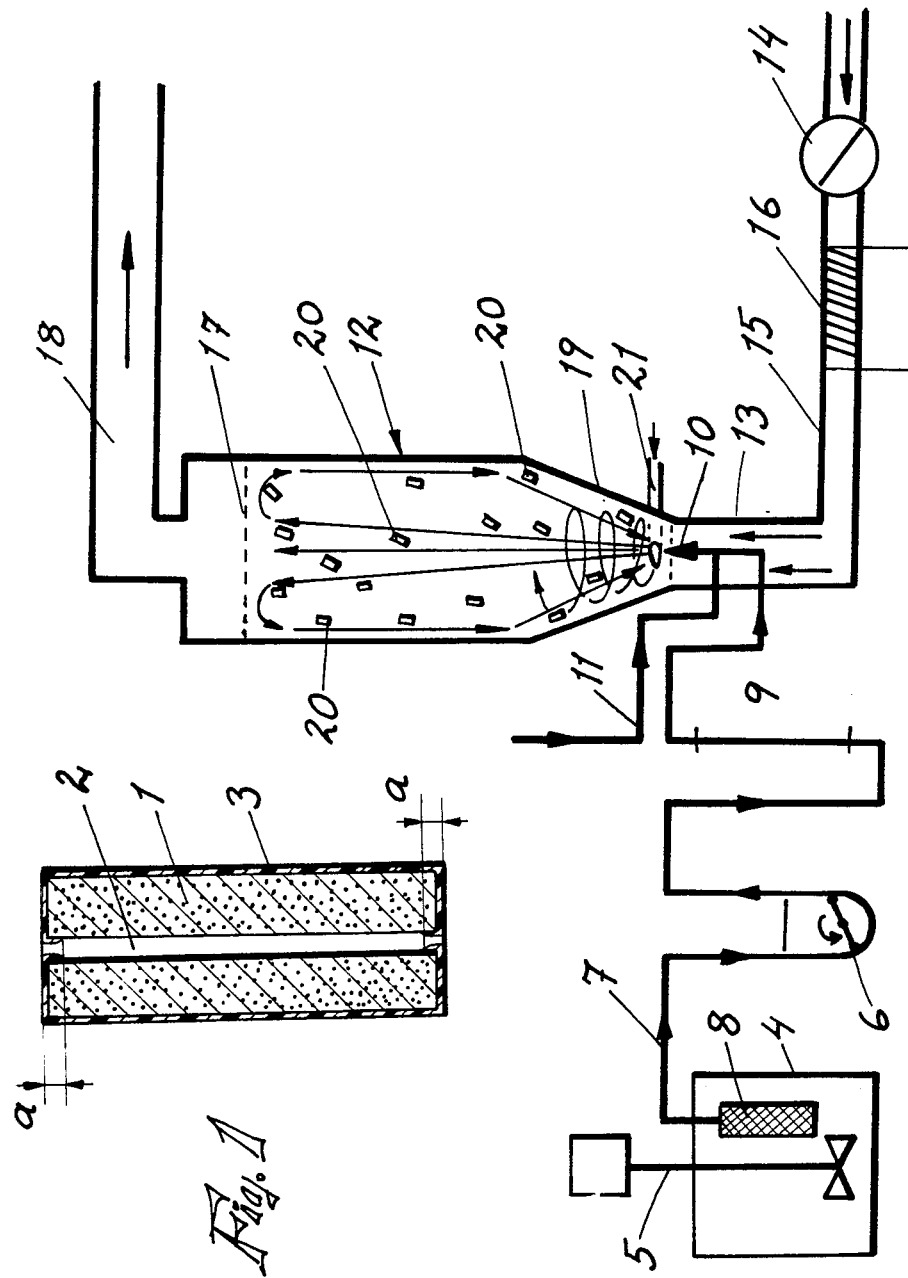

METHOD OF PRODUCING PROGRESSIVELY BURNING ARTILLERY PROPELLANT POWDER AND AGENT ADAPTED THERETO

The invention relates to a general method of producing a progressively burning deterrent-coated powder, more particularly artillery propellant powder; a modification of such method adapted to the deterrent coating of a powder but up into shorter lengths or a granular powder, more particularly so-called tubular powder, and to a deterrent substance adapted to such methods.

The deterrent coating of a powder means that one or more of its surfaces which are otherwise accessible to combustion are coated with a difficulty combustible or non-combustible substance, so as to compel the powder to burn exclusively along those surfaces which are not coated with deterrent.

The invention should be mainly applicable to the production of progressively burning, cross-perforated rod-shaped powder or alternatively progressively burning tubular powder.

The aforementioned cross-perforated rod-shaped powder consists of relatively large, preferably substantially rectangular powder rods formed with a very large number of perforations which extend longitudinally through at least the majority of the thickness of the powder rod. This kind of propellant powder can be used in propellant charges for pieces of artillery. The loading chamber or shell is filled with a number of powder rods of this kind disposed close beside one another. The advantage of this kind of powder is that it burns progressively—i.e., the surface accessible to combustion increases as the powder rods burn away, not only via their outsides but also along the insides of the perforations. The progressive burning of the powder can be enhanced if the outsides of the powder rods are coated with a non-combustible or difficulty combustible coating—i.e., the powder is given a deterrent coating, so that combustion takes place exclusively along the insides of the perforations.

Another kind of progressively burning artillery propellant powder charge contains so-called tubular powder in the form of relatively short pieces of powder tubes formed with one or more continuously extending longitudinal channels. As a rule pieces of tubular powder are disposed completely at random in the charges. The progressive burning of tubular powder can also be improved by coating the outsides of the powder tubes with a non-combustible or difficulty combustible coating—i.e., a deterrent coating. The various sizes of cross-perforated rod-shaped powder or tubular powder created the need for the aforestated variants of the method according to the invention.

The surface life of conventional artillery is as a rule relatively long, partly due to the fact that pieces of artillery are generally highly resistant to wear, and partly due to their high cost price. In contrast, the service life of the ammunition associated with the artillery is substantially shorter. As a result, an attempt is always made first of all to increase the capacity of artillery by improving the ammunition. An increase in the range of a given gun system must be achieved without the maximum pressure in the barrel (Pmax) exceeding the value for which the barrel was constructed. Even in the case of absolutely new constructions, Pmax must be limited to the greatest possible extent, since any increase in Pmax increases the strength demands which must be made on the barrel and the gun mechanisms. The range of a given gun system can be increased either by increasing the ejection velocity of the projectile ($V_o$), or by improving its ballistic properties. As a rule, an attempt is made to do both.

To achieve an increased $V_o$ for an unchanged weight of projectile, the combustion of the powder must take place in accordance with a pressure-time curve with a relatively large operating surface. For a given gun system with the restrictions always caused by Pmax, the volume of the loading chamber and the weight of the projectile, this can be done by increasing the density of the charge, the calorific power of the powder or its progressive burning.

The ideal thing would be if during the combustion of the propellant powder a trapezoidal pressure-time curve could be achieved in the gun barrel which made the optimum use of the strength of the barrel and the projectile, the burning speed of the propellant powder being so adapted it finishes burning late enough for the pressure at the mouth of the barrel to be acceptable.

A trapezoidal pressure-time curve during the burning of the powder means that the increase in volume taking place behind the projectile during its movement through the barrel is continuously compensated by an adequate powder gas production. This presupposes that the powder gas production successively increases in rhythm with the combustion of the powder charge. Powder with this special property is said to burn progressively.

A granular powder can be made to burn progressively by the grains being given a geometrical shape such that their accessible burning area successively increases as the outer powder layers burn away. Examples of such powders are 3, 7, 19 and 37—perforation powder—i.e., short powder tubes formed with a corresponding number of channels extending continuously in parallel.

In another method of producing progressively burning granular powder, more particularly the burning properties of the outer layers of the powder are moderated by a surface treatment using various kinds of low-molecular plasticizers. However, due to the general migration tendencies of plasticizers, this method can be used only for powder containing less than 10–12% plasticizer of the glycerol trinitrate type or corresponding. Other methods must be used as deterrent agents for powder which itself contains high content of plasticizer. In one of these methods certain surfaces of the powder grains, more particularly their outer surfaces are given a surface coating of a deterrent or deterrent substance which prevents or at least appreciably delays the ignition of the deterrent-coated powder surfaces. One absolute demand which must be made on an inhibitor is that it must be so high molecular that it cannot migrate. A tubular powder which has received a deterrent coating on the outside and along its ends can, for example, be caused to burn at first only along the insides of the perforation channels, the result being a progressively larger burning area. If in addition the deterrent coating is so adapted as to burn through at a suitable time, the burning surface of the powder increases suddenly at that moment. Such a delayed ignition of a certain proportion of the powder surface must therefore be so adapted that it takes place at the time Pmax is reached or immediately thereafter. Of course, the demand from a reproducible course of burning is substantially absolute where deterrents of this kind are concerned. The burning away of deterrents in dependance on pressure is therefore advantageous, since it facilitates the adjustment of the time of burning through.

To sum up, therefore, it may be said that granular powder can be caused to burn progressively either by the selection of a suitable geometrical shape for the powder grains, or by various surface treatment methods. Of course, the various methods can also be combined.

Rod-shaped powder can be made progressively burning in a corresponding manner to that already mentioned by giving it a large number of perforations which all enable the powder to burn away along such perforations, which of course progressively widen—i.e., provide a larger burning area as combustion progresses. The perforations extend lengthwise through the powder rods. As early as 1895, British Pat. No. 16,861 disclosed a preforated rod-shape powder of this kind i.e., one which gave progressive burning and could conveniently be used if a high charge density and progress burning of the charge were desired.

Theoretical calculations have certainly shown that with unchanged charge weights, limited gains in $V_o$ can be achieved only be means of a progressively burning powder; however, the same calculation also show that one way of increasing $V_o$ appreciably for a gun system without exceeding a given Pmax is to introduce combination charges with higher charge weights built up from powder burning with different progressivity. To make the maximum use of a powder of the kind disclosed herein before, whether a tubular powder or a perforated rod-shape powder, the powder must be given a deterrent coating, so that it is burnt only along the inner walls of the perforations or channels, at least during the initial stage, until Pmax is reached.

A number of various demands must be met to enable a substance to be used as a deterrent coating for powder.

The deterrent substance must therefore be compatible with the powder and must not reduce its stability, even after a long period. The powder itself must be acted upon by the powder only to a small extent so that it must contain only a small quantity of nitrate esters such as glycerol trinitrate and moderators (plasticizers) such as triacetin in the equilibrium state. The substance must have satisfactory adhesion to the powder so that mechanical stressing cannot expose surfaces previously given a deterrent coating, the result being an uneven ballistic result. Of course, best of all is for the deterrent coating to be chemically bonded to the surface of the powder. In addition, the substance of the deterrent coating must have a coefficient of longitudinal expansion of the same order of magnitude as the powder, or alternatively has a resilience permitting differences in the coefficient of expansion.

The deterrent substance must also be completely or substantially converted in to gaseous products which do not disturb the functioning of the mechanism for the next shot, and if possible it must not cause smoke.

A number of demands can be made on a deterrent substance purely from the production aspect, including the following:

(1) it must permit reproducible application in a thin layer intermittently continuously (2) it must allow the admixture of relatively large quantities of filler (coolant)

(3) it must be free from flammable and environmentally harmful components.

In view of these demands due to the production aspect, it can be assumed that a suitable polymer can be selected for this purpose. In that case there are further demands due to the production aspect, namely:

(a) The polymer must have a long so-called "pot life"—i.e., must be storable for a reasonable time without becoming self-polymerised (b) the polymer must permit rapid adhesion by hardening or film formation at a moderate temperature, and such hardening must not be effected by components off the powder or water, if for safety's sake the powder is handled together with the water.

The above listed demands have raised two different problems which depend on one another, namely the selection of the deterrent subject and the selection of the method of application. The present invention is aimed at solving both these problems.

An earlier attempt to solve what was basically the same problem is described in an Article by J. E. Flanagan on page 285–294 of the Report of the 1974 Annual Conference of the Institute for the Chemistry of Propellants and Explosives (German). That Article describes how to give powder a deterrent coating by a spraying process directly at the extruder in the continuous extrusion of the powder. The deterrent substance used was a polymer built up from polyethylene glycol and polymethyl polyphenyl isocyanate. The same method is basically disclosed also in Flanagan's U.S. Pat. No. 3,948,697.

According to the invention, therefore, rod-shaped perforated powder for weapons having barrels is given a deterrent coating by the powder rods being treated with a film forming or polymerizable deterrent substance consisting of a water-urethane dispersion containing tertiary amine blocked carboxyl groups, which during film formation split off tertiary amine, the result being a strong cross bonding in the polyurethane obtained. It is therefore an essential feature of the invention that the deterrent substance is fed to the powder in the form of a dispersion or solution, the solvent or dispersing agent, which is preferably water, thereafter being driven off, the consequence being a cross bonding of the dispersing substance.

We found that an exceptionally suitable variant of the type of polyurethane outlined above is one which is built up from aliphatic isocyanate combined with a caprolactone polyester having the general formula

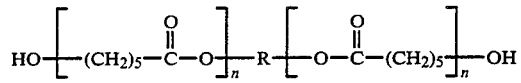

where R=polymerization initiator. The total molecular weight of such polyurethane should be between 200 and 6000.

In the great majority of cases a coolant can and should be included in a deterrent substance of the type in question. We have found that compounds which decompose endothermically in to gaseous products are generally satisfactory coolants. Especially good coolants are found amongst such formaline-based products as oxamide, dimethylol urea. Titanium dioxide is also a good coolant. In addition to coolant, the deterrent layer can also incorporate other solid substances, such as flame dampers and decoppering agents. This is no problem since the quantity of coolant and possible other substances can be up to 80% by weight (preferably 35–65% by weight) calculated on the dry substance in the deterrent layer—i.e., polyurethane+coolant and/or other solid substances.

According to the invention the water-urethane dispersion is applied to the rod-shaped powder by spraying, immersion or painting, whereafter the dispersing agent—i.e., the water is driven off. Often spraying should produce the best result, since it can be expected to produce an even, bubble-free coating. The deterrent coating of rod-shaped perforated powder for weapons having barrels as disclosed hereinbefore must not be mixed together with various casting processes which were previously used for providing rocket powder with a deterrent.

A casting process of that kind is disclosed inter alia in U.S. Pat. No. 3,188,962, according to which a polyurethane system is used which is based on aromatic diisocyanate and polyesters, so that operation must be performed in the complete absence of water, because otherwise a very violent reaction would take place, resulting at its height in a porous scum. This citation also shows indirectly, via the drawings and the casting method used, how thick the deterrent layer on a rocket powder must be in order not to burn through and to completely control the combustion to the undeterred end surface of the rocket powder. In contrast, in the case of an artillery power it may be convenient for the deterrent layer to burn through, on condition that this takes place at a suitable time after Pmax has been reached in the gun.

As already indicated, the invention also relates to a method of providing a deterrent coating for powder cut up in to smaller pieces, more particularly so-called tubular powder, in shorter lengths. In this variant the short powder tubes, referred to hereinafter as powder grains, are treated with the same kind of film-forming polymerizable deterrent substance as that mentioned hereinbefore, but with the difference that the deterrent substance is fed to the powder grains while they are kept suspended in a fluidised bed. The deterrent substance is fed to the bed in the form of a finely divided solution or dispersion, while the powder grains are kept suspended in the bed.

The fact is that we have discovered that an adequate concentration of the finely divided dispersion or solution of the deterrent substance in a fluidised bed produces a particularly even coating of regularly reproducible thickness on the outer surfaces of the powder grains, while any perforations bounding the walls remain substantially uncoated on condition that such perforations have the diameters of under 2 mm normal in this connection.

Also in this variant of the invention, the supply of the finely divided dispersion or solution of deterrent substance is interrupted when an adequate coating thickness has been obtained. In contrast, the power grains are left in the fluidised bed until the solvent or dispersing agent has been driven off via the outlet for surplus vehicling medium with which a fluidised bed is usually provided.

The method according to the invention can be used for giving granular powder a deterrent coating having one or more layers of deterrent superimposed on one another. The fact that the method according to the invention in practice enables the same powder drain to be coated with a number of different superimposed layers opens up many advantages possibilities. For example, it would be possible to incorporate decoppering agent for the barrel of the gun and flame retarder in a suitable layer.

With a multi-layer coating the powder grains can be shifted between different continuously operating fluidised beds, through which they are successively passed and where they are brought in to contact with different finely divided film-forming deterrent substances. Alternatively, the various deterrent substances can be individually fed in finely divided form to the same fluidised bed, in which the grains are kept suspended with continuous mixing. It may even be practical to transfer the coated powder grains immediately after coating to a special fluidised bed, where a finel drying of the surface coating takes place.

The method according to the invention is intended for the treatment of any type of granular grain of any desired geometrical shape and with a cross-sectional diameter not substantially exceeding 20 mm. The powder can therefore be either singly or multiply perforate, porous or completely homogeneous. A completely homogeneous powder for example, a bullet powder which has been given a deterrent coating is of course not in itself progressively burning, but when mixed with undeterred powder it can during combustion cause a suddenly increased gas production, and sometimes this may be very desirable.

The deterrent coating for which we were looking, and which we also achieved by the method according to the invention, has a thickness of 2–500 $\mu$m.

We were also able to observe that the method according to the invention gives readily reproducible results, the deterrent layer thickness obtained in each separate treatment agreeing very satisfactorily between different batches, on condition that the variables were presented by the quantity fed, the concentration of the deterrent substance, and its feed speed and the treatment time of the powder grains in the fluidised bed are not altered between the various batches.

The chemical composition of the deterrent substance has already been referred to briefly, but purely in general it may be noted that a deterrent substance of the kind in question must have a specific burning speed of between one tenth and half the powder's own burning speed.

Deterrent layers of strongly cross-bonded polyurethanes produced according to the invention have been found to adhere satisfactorily to the powder grains; they also have a chemical composition such that they cannot be expected to reduce the quality of the powder, even if it is stored for a very long time. Another advantage is that as starting material they are water-based and therefore easy to deal with from the environmental standpoint.

The performance of the method disclosed hereinbefore requires an arrangement in which, by means of a gaseous vehicling medium, a fluidised bed can be maintained in which the powder grains treated can be kept suspended while being continuously mixed and to which the solution or dispersion of the deterrent substance can be fed in a finely divided form. Such an arrangement can comprise a cylindrical chamber having a frustoconical lower part. In the centre of the base of such lower part are disposed on the one hand an inlet for the vehicling medium which can therefore be air and which must be supplied at a certain speed, and on the other hand a mouthpiece for the supply in finely divided form of the deterrent substance in the form of a solution or dispersion, together with a propellant, which can also be air. The deterrent substance is fed by a metering pump to the associated mouthpiece from a storage tank having an agitator. The required mixing of the materials suspended in the fluidised bed can be achieved by a certain inclination or helical twisting of the gas flow producing the fluidised bed, or else a special gas inlet can be used which rotates the vehicling flow slightly. The latter method will often be preferable, since it is simple to operate.

The invention is defined in the claims which follow and will now be described in somewhat greater detail in connection with the accompanying drawings.

In the drawings FIG. 1 is a cross-section through a singly perforate powder grain which has been given a deterrent coating in the manner according to the invention, and FIG. 2 shows diagrammatically an arrangement for the performance of the method according to the invention.

FIG. 1 shows powder 1, a central channel 2 in the powder grain, and a surface deterrent coating 3 has been applied. (The figure was drawn from a photograph of a singly perforate powder of 6 mm external diameter 1 mm internal diameter coated according to the invention). It should be noted that the deterrent coating 3 is thickened only around the corner at the ends of the channel 2 and a very short distance a down in to the channel. Both ends of the channel are still open, even though with a somewhat reduced cross-sectional area. To make the drawing clearer, the deterrent layer 3 is shown thicker than it really is. Basically similar deterrent coatings are obtained when multiply perforate powder is treated by the method according to the invention. For example, we achieved outstanding results with 7-perforation rosette powder.

The arrangement shown in FIG. 2 for the performance of the method according to the invention comprises a tank 4 for water-dispersed polyurethane as defined hereinbefore. Disposed in the tank is an agitator 5. Dispersion is metered out of the tank 4 by means of pump 6 and a pipe 7 connected to a filter 8 in the tank. From the pump 6 the dispersion is fed via a flowmeter 9 to a mouthpiece 10. From the mouthpiece the dispersion is delivered in a finely divided form by means of a propellant medium, preferably air, which is supplied to the mouthpiece 10 via a special pipe 11. The propellant medium is supplied at a certain speed either from a pressure source or means of a fan.

The mouthpiece 10 is disposed at the base of a chamber 12 in which a fluidised bed can be maintained by means of a vehicling medium, preferably air. In fact the mouthpiece 10 is disposed in the centre of an inlet 3 for the vehicling medium, which is fed in at a predetermined speed by a fan 14 via a pipe 15. The fan is followed by a pre-heating arrangement 16 for controlling the temperature of the vehicling medium.

A wire network 17 and an outlet 18 for surplus propellant and vehicling medium are disposed in the upper part of the chamber 12. A number of powder grains 20 suspended in the vehicling medium are shown in the chamber 12. Their general movements in the chamber are indicated by arrows. Arrows also indicate the directions of flow in the various pipes. To ensure the continuous mixing of powder grains 20 in the suspension bath, the chamber 12 can be provided with one or more radially or eccentrically directed inlets 21 for vehicling medium by means of which the flow of vehicling medium through the chamber 12 can be made to rotate. Such a mouthpiece 21 can be permanently coupled, or activated only when the mixing in the suspension bath shows a tendency to get stuck. It should also be possible to rotate the suspension bath to some extent by, for example, guiderails or baffles disposed at an inclination in the inlet 13.

When the arrangement shown in FIG. 2 for the process according to the invention is used, the powder grains are first filled in to the chamber 12, whereafter the fluidised bed is built up in the chamber by the fan 14 being started. The fluidised bed has been formed deterrent substance is fed to the chamber 12 in the form of fine droplets of dispersion from the tank 4. The feed is performed by the pump 6, and means of the propellant medium from the pipe 11.

By practical tests it has been discovered what quantities of deterent agent must be fed to the chamber 12 to produce a deterent coating of the required thickness. Thereafter the supply of deterrent substance via the mouthpiece 10 is interrupted, but the powder grains are still kept suspended in the fluidised bath until all the water and solvent has been driven off. Thereafter the supply of vehicle medium via the fan 14 is interrupted, and the powder grains complete with their deterrent coating can be removed from the chamber 12.

The invention will now be described in somewhat greater detail in connection with a few Examples. Examples I-III relate to the production of cross-perforated deterrent-coated rod-shaped powder, while Example IV and the subsidiary Examples 1-18 which it includes relate to the production of deterrent-coated tubular powder.

EXAMPLE I

For these experiments use was made of a double-base powder with a high glycerol trinitrate content. The powder was produced in the form of rods having the following dimensions: 17×17 mm and a length 200 mm.

The deterrent was produced by the following process:

Stage I
50% polyurethane dispersion* (34% solid polymer)
50% oxamide
*(polyurethane dispersion according to the application).

Mixing was performed on 3 rolling mills, so that complete homogeneity was achieved.

Stage II
403 g of the above water-containing polyurethane-oxamide mixture was mixed, accompanied by agitation, with 200 g of 34% polyurethane dispersion and 500 g distilled water.

Stage III
The deterrent mixture was applied to the powder rods using Atlas Copco ECCO-FEED spraying unit. An ECCO 50 spraygun was used for the application. The feeding unit was completely compressed-air-driven. It had product valves and air-reducing valves which were mounted on the cover of the apparatus, together with a single-acting noise insulated piston pump with an intake screen. The pressure ratio was 1;2. The maximum product capacity was 1.5 liters per minute, the air requirement being 15 liters per minute. After film formation deterrent layer was obtained of 270-360 $\mu$m, which adhered so satisfactorily to the surface of the powder that the surface could be machined. It met demands made as regards combustion technique.

EXAMPLE II

In these experiments also use was made of a double-base powder with a high glycerol trinitrate content. The powder was produced in the form of rods with the following dimensions: 17×17 mm and a length of 200 mm.

The rods were given a perforation using nails. Then the deterrent was applied in the same way as described in Example I. It is true that the holes were blocked, opened up again immediately the powder was ignited.

EXAMPLE III

Performed like Examples I and II. The powder was perforated after the application and film formation of the deterrent.

polyurethane coating according to the invention, while Ox=oxamide.

The last column in the table shows the force required to press the powder tube or powder grain out of the deterrent coating when the latter is cast in plastics with a very good adhesion to the outside of the deterrent coating.

Key to headings of Table 1.

A=batch number; B=dimensions of powder in mm—"dy"=esternal diameter of grain, "di"=diameter of perforation; C=kind of deterrent; D=spraying air; E=drying air, temperature out (C°); F=filter resistance mm $N_2O$; G=time in minutes; H=yield in grams; I=deterrent on powder (%); J=deterrent thickness in mm; K=deterrent thickness at ends in mm; L=adhesion between deterrent and powder.

TABLE 1

| Batch number. | Dimension of powder in mm. */ | Kind of deterrent. | Spraying air. | Drying air, temp. out °C. | Filter resistance mm $N_2O$. | Time in minutes. | Yield in grams. | Deterrent on powder (%). | Deterrent thickness in mm. | Deterrent thickness at ends in mm. | Adhesion between deterrent and powder. |
|---|---|---|---|---|---|---|---|---|---|---|---|
| 1 | dy 6 di 1 | PUR/Ox | 2 bar | 40 | 0 | 40 | 1112.06 | 10.08 | 0.204 | 0.295 | 921 N |
| 2 | ". | ". | 2 bar | 38 | 0 | 20 | 1071.84 | 6.70 | 0.135 | 0.190 | |
| 3 | ". | ". | 2 bar | 40 | 0 | 10 | 1029.70 | 2.88 | 0.069 | 0.090 | 875 N |
| 4 | ". | 60% Ox 40% PUR | 2 bar | 40 | 0 | 40 | 1110.00 | 9.91 | 0.207 | 0.268 | 1200 N |
| 5 | ". | ". | 2 bar | 40 | 0 | 20 | 1069.20 | 6.47 | 0.132 | 0.164 | |
| 6 | dy 6 di 3 | ". | 3 bar | 40 | 0 | 40 | 1118.00 | 10.55 | 0.235 | 0.308 | |
| 7 | ". | ". | 3 bar | 40 | 0 | 20 | 1076.50 | 7.11 | 0.145 | 0.200 | |
| 8 | ". | ". | 3 bar | 40 | 0 | 15 | 1054.0 | 5.12 | 0.108 | 0.144 | |
| 9 | dy 6 di 1 | PUR | 2 bar | 40 | 0 | 40 | 1036.70 | 3.54 | 0.123 | 0.169 | |
| 10 | ". | ". | 2 bar | 40 | 0–40 | 80 | 1084.30 | 7.77 | 0.231 | 0.336 | |
| 11 | dy 6 di 3 | ". | 3 bar | 40 | 0–40 | 40 | 1036.20 | 3.49 | 0.127 | 0.141 | |
| 12 | ". | ". | 3 bar | 40 | 0–40 | 80 | 1084.00 | 7.75 | 0.193 | 0.259 | |
| 13 | dy 6 di 1 | PUR/$TiO_2$ | 2 bar | 38–40 | 0–40 | 40 | 1066.28 | 6.22 | 0.167 | 0.188 | |
| 14 | ". | ". | 2 bar | 38–40 | 0–40 | 20 | 1027.53 | 2.68 | 0.090 | 0.102 | 1456 N |
| 15 | dy 6 di 1 | ". | 2 bar | 38–40 | 0–60 | 70 | 1109.17 | 9.84 | 0.254 | 0.319 | 237 N |
| 16 | ". | ". | 2 bar | 38–40 | 0–40 | 60 | 1095.00 | 8.68 | 0.201 | 0.233 | |
| 17 | dy 6 di 3 | ". | 3 bar | 38–42 | 0–50 | 70 | 1115.00 | 10.31 | | | |
| 18 | ". | ". | 3 bar | 38–42 | 0–40 | 40 | 1065.00 | 6.10 | | | |

*/ "dy" = esternal diameter of grain
"di" = diameter of perforation

EXAMPLE IV

In an arrangement of the kind shown in FIG. 2 various kinds of single-hole tubular powder were given a deterrent coating with a water-dispersable polyurethane of the kind whose general formula was stated hereinbefore. Table 1 shows various technical data for the test powders produced in this way.

In each of the experiments shown in Table 1 the quantity of powder dealt with was 1000 grams. The metered quantity of deterrent substance per unit of time remained unaltered throughout. The same thing applies to the quantity of drying air which was 130 m³/h. In all the experiments the temperature of the entering drying air was 50° C. The length of the powder grains varied between 14 and 16 mm. The powder grains dealt with were of the single-hole type, where dy=external diameter off the powder grains, and di=diameter of the perforations. In column 3 in the Table PUR means a

We claim:

1. A method of producing a progressively burning deterrent-coated propellant powder for weapons having a barrel which comprises coating the outer surfaces of the said propellant powder with a film-forming deterrent substance by feeding to said powder said deterrent substance dissolved or dispersed in water and, thereafter, driving off said water.

2. The method of claim 1 wherein said powder is rod-shaped tubular powder.

3. The method of claim 1 wherein said deterrent substance is polymerizable.

4. The method of claim 3 wherein said deterrent substance is a water-dispersible polyurethane with a molecular weight between 200 and 600 built up from an aliphatic isocyanate and a caprolactone polyester having the formula:

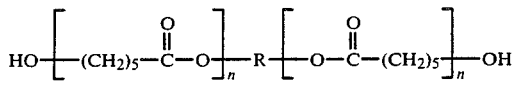

where R = the polymerization initiator.

5. The method of claim 4 wherein said powder is rod-shaped tubular powder.

6. The method of claim 4 wherein said powder is granular powder or tubular powder cut up into shorter lengths; wherein the powder is coated with the deterrent substance while the powder is kept suspended in a fluidized bed to which the deterrent substance is fed; and wherein the water is driven off from the powder before the powder is removed from the said fluidized bed.

7. The method of claim 6 wherein the powder is kept suspended in the fluidized bed until all of the deterrent substance attached to the powder has been polymerized.

8. The method of claim 7 wherein fed to the outer surfaces of the powder in the fluidized bed are a number of superimposed deterrent layers, each of which contains, in addition to the film-forming substance and the water, at least one additive selected from the group of coolants, flame dampers, and decoppering agents.

9. The method of claim 8 wherein said additive is present in an amount of up to 80% by weight based upon the amount of finally solid substance.

10. The method of claim 9 wherein said amount is 35–65% by weight.

11. The method of claim 8 wherein said additive is a formaline-based material or titanium dioxide.

12. The method of claim 8 wherein said additive is oxamide or dimethylol urea.

13. The method of claim 1 wherein said coating has a thickness of 2–500 $\mu$m.

14. The method of claim 1 wherein said deterrent substance is a polymerizable water-urethane dispersion containing tertiary amine blocked carboxyl groups which, during film formation, split off tertiary amine.

15. The method of claim 1 wherein said powder is granular powder or tubular powder cut up into shorter lengths; wherein the powder is coated with the deterrent substance while the powder is kept suspended in a fluidized bed to which the deterrent substance is fed; and wherein the water is driven off from the powder before the powder is removed from the said fluidized bed.

* * * * *